United States Patent
Cockerham et al.

(10) Patent No.: US 6,246,965 B1
(45) Date of Patent: Jun. 12, 2001

(54) PRE-DISTORTION TUNING FOR ANALOG LASERS

(75) Inventors: Kenneth L. Cockerham, Milford Township, Bucks County; Stephen B. Krasulick, Fogelsville; Thomas F. Strelchun, Mertztown; Paul K. Tallat-Kelpsa, Maidencreek Township, Berks County; Anthony J. Wiencek, Rockland Township, Berks County, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/164,724

(22) Filed: Oct. 1, 1998

(51) Int. Cl.[7] ............................. C01D 21/00; H04N 5/38
(52) U.S. Cl. ......................... 702/85; 702/107; 702/124; 359/161; 348/723
(58) Field of Search .................. 702/40, 57, 58, 702/66, 76, 81, 85, 104, 106, 107, 117–124, 126, 134, 159, 172, 182–185, 189, 198; 359/161, 187; 324/620, 752, 750, 121 K; 345/134, 347, 348, 184, 970; 348/723, 724

(56) References Cited

U.S. PATENT DOCUMENTS

| | | | |
|---|---|---|---|
| 4,754,329 | * 6/1988 | Lindsay et al. | 348/189 |
| 5,072,187 | * 12/1991 | Shilo | 324/623 |
| 5,077,619 | * 12/1991 | Toms | 359/187 |
| 5,119,506 | * 6/1992 | McGann | 455/116 |
| 5,361,156 | * 11/1994 | Pidgeon | 359/161 |
| 5,487,016 | * 1/1996 | Elms | 702/71 |
| 5,600,475 | * 2/1997 | Uesaka | 359/161 |
| 5,850,305 | * 12/1998 | Pidgeon | 359/187 |
| 6,014,027 | * 1/2000 | Reichard | 324/623 |

\* cited by examiner

*Primary Examiner*—Kamini Shah
*Assistant Examiner*—Manuel L. Barbee
(74) *Attorney, Agent, or Firm*—Steve Mendelsohn (57) ABSTRACT

In a test configuration for a pre-distortion board configured with an analog laser, a test operator adjusts the settings for one or more components (e.g., potentiometers) on the pre-distortion board, e.g., to optimize the linearity of the analog laser, relying on information contained in a graphical display presented on a computer monitor. In one embodiment, a signal generator generates electrical signals, the pre-distortion board distorts the electrical signals, the analog laser converts the distorted electrical signals into optical signals, an optical receiver converts the optical signals back into electrical signals, a band-pass filter filters the converted electrical signals, an RF spectrum analyzer generates amplitude vs. frequency data from the filtered electrical signals, and a computer generates the graphical display from the amplitude vs. frequency data, wherein the graphical display has a bar graph that graphically and textually indicates the current distortion level of the analog laser relative to a distortion requirement level and an extreme distortion level for the current test.

22 Claims, 5 Drawing Sheets

PRE-DISTORTION TUNING FOR ANALOG LASERS

BACKGROUND OF THE INVENTION

1. Field of the Invention

The present invention relates to optical communications, and, in particular, to the tuning of pre-distortion for analog lasers used in optical communication systems.

2. Description of the Related Art

Some fiber optic communication systems, such as those used to distribute cable television signals, rely on analog lasers to convert electrical signals into analog optical signals for transmission over fiber optic cables. When used to transmit cable TV signals, each optical fiber carries optical signals for different television channels, where each television channel has its own unique carrier frequency.

When two (or more) analog optical signals having different carrier frequencies travel along a single optical fiber, interference between the optical signals will result. For example, when a 75-MHz signal and a 50-MHz signal travel along a single optical fiber, interference between the two signals leads to noise at (75−50) or 25 MHz and at (75+50) or 125 MHz. In fiber optical communication systems, it is known to pre-distort the electrical signals prior to conversion into optical signals by an analog laser in an attempt to correct for non-linearities in the laser. This pre-distortion essentially adds "negative interference" to the electrical signals to reduce the adverse effects of interference that occurs during the transmission of the corresponding optical signals over optical fibers. In a typical implementation, a circuit board having a special pre-distortion circuit, is placed between the source of the electrical signal and the analog laser to pre-distort the electrical signals before they are converted into optical signals by the laser.

Although a given set of analog lasers may share the same design, variations during the manufacturing process may result in differences in the certain operating characteristics from laser to laser. These differences usually imply that each analog laser will require a different pre-distortion function to achieve optimal linearity. In a typical implementation, an analog laser and a pre-distortion board are placed in a test configuration in which potentiometers on the pre-distortion board are manually adjusted to change certain capacitance and/or resistance values within the pre-distortion circuit to tune the pre-distortion board to optimize the linearity of the analog laser. A typical tuning sequence involves the application of signals corresponding to two or more different frequency channels to characterize the performance of the analog laser and adjust the potentiometer settings on the pre-distortion board for each different channel. After tuning is completed, the analog laser and the corresponding tuned pre-distortion board may then be configured together in an actual communications system.

Conventional test configurations rely on a radio frequency (RF) spectrum analyzer to generate graphical displays representing the performance of the analog laser during the tuning of the pre-distortion board. Typical graphical displays are cartesian graphs showing signal amplitude as a function of signal frequency as presented on the cathode ray tube (CRT) display of the RF spectrum analyzer. For a given channel with a particular carrier frequency, the test operator uses the graphical display to track the performance of the analog laser as the appropriate potentiometer settings are adjusted. Due both to the small size of the CRT display of an RF spectrum analyzer and to the nature of the graphical display presented thereon, the accurate tuning of pre-distortion boards for analog lasers can be both difficult and inefficient using conventional test configurations.

SUMMARY OF THE INVENTION

The present invention is directed to a scheme for tuning pre-distortion boards used to optimize the linearity of analog lasers. According to one embodiment, electrical signals are applied to the pre-distortion board, wherein the pre-distortion board converts the electrical signals into distorted electrical It signals and the analog laser converts the distorted electrical signals into optical signals. Data are generated characterizing the optical signals generated by the analog laser, and a graphical display is generated based on the data and presented on a computer monitor, wherein the graphical display provides information for use in adjusting settings of one or more components on the pre-distortion board.

According to an alternative embodiment, data are received characterizing optical signals generated by the analog laser based on distorted electrical signals generated by the pre-distortion board, and a graphical display is generated based on the data and presented on a computer monitor, wherein the graphical display provides information for use in adjusting the settings of one or more components on the pre-distortion board.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
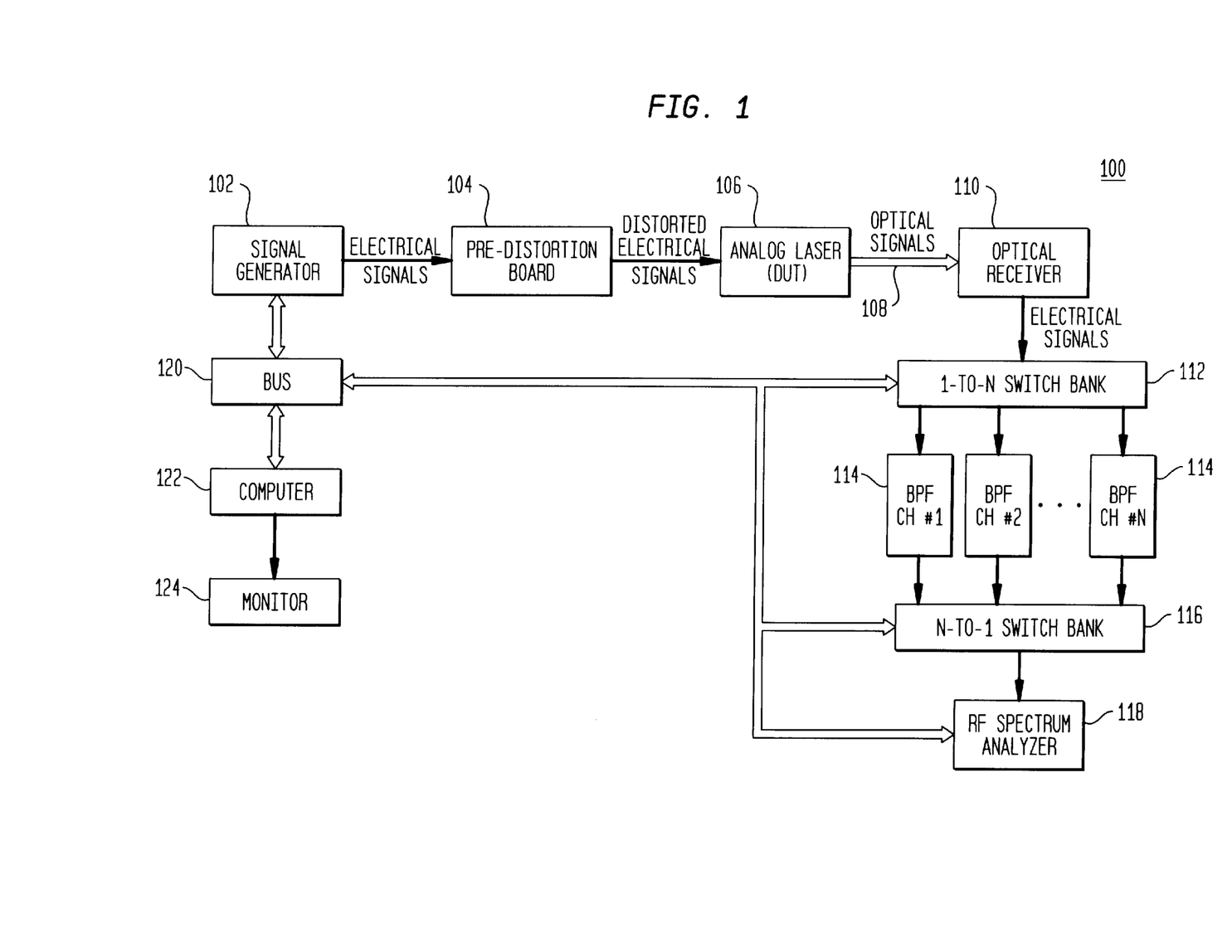
FIG. 1 shows a block diagram of a test configuration, according to one embodiment of the present invention.

FIG. 1 shows a block diagram of a test configuration 100, according to one embodiment of the present invention. As shown in FIG. 1, a pre-distortion board 104 and an analog laser 106 (i.e., a device under test or DUT) are configured into test configuration 100 in order to tune pre-distortion board 104 to optimize the linearity of analog laser 106. In particular, pre-distortion board 104 receives electrical signals generated by signal generator 102 and generates distorted electrical signals, which are then converted into optical signals by analog laser 106. These optical signals are transmitted over an optical fiber 108 to an optical receiver 110, which converts the optical signals back into electrical signals. 1-to-N switch bank 112 switches the electrical signals from optical receiver 110 to one of N band-pass filters (BPF) 114, each of which corresponds to a different TV channel (e.g., BPF CH #1 may correspond to National Television Systems Committee (NTSC) Channel 3, BPF CH #2 may correspond to NTSC Channel 6, and BPF CH #N may correspond to NTSC Channel 78). N-to-1 switch bank 116 switches the filtered electrical signals from the appropriate band-pass filter 114 to the input of an RF spectrum analyzer 118, which generates and transmits data characterizing the received electrical signals (e.g., signal amplitude as a function of signal frequency) via bus 120 to computer 122, which in turn uses that data to generate and present graphical displays on monitor 124 to be viewed by the test operator.

Computer 122 also uses bus 120, which may be a GPIB-488 Bus, to communicate with signal generator 102 and switch banks 112 and 116. In particular, computer 122 can be used to control the operations of signal generator 102 (i.e., to generate electrical channel signals corresponding to one or more selected carrier frequencies) and switch banks 112 and 116 (i.e., to select a particular band-pass filter 114).

Figure 2:
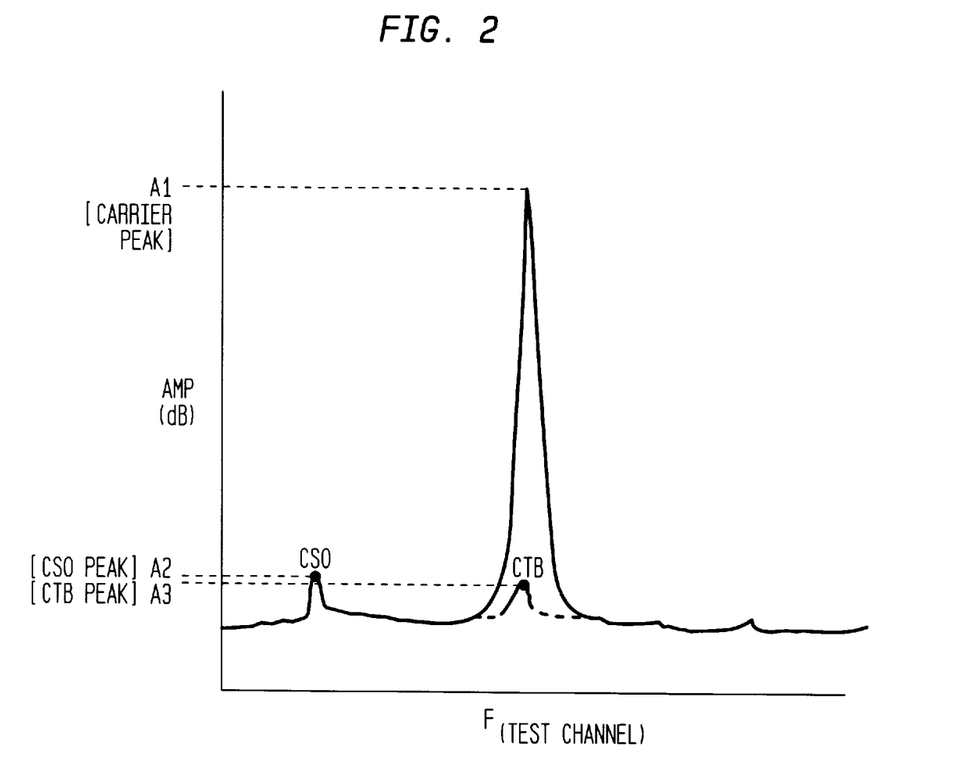
FIG. 2 shows a graphical representation of the different signals used to characterize the performance of an analog laser, such as the laser of FIG. 1, in order to tune a pre-distortion board, such as the board of FIG. 1, to optimize the linearity of the analog laser.

FIG. 2 shows a graphical representation of the different signals used to characterize the performance of an analog laser, such as laser 106 of FIG. 1, in order to tune a pre-distortion board, such as board 104 of FIG. 1, to optimize the linearity of the analog laser. In particular, the curves depicted in FIG. 2 show three significant peak amplitudes: the peak amplitude A1 of the carrier for a specific selected channel, the peak amplitude A2 of the largest second-order interference caused by carriers in a composite signal (i.e., a signal having two or more signals with different carrier frequencies), and the peak amplitude A3 of the third-order interference caused by other carriers in the composite signal and coinciding with the carrier frequency. Second-order interference corresponds to interference between the carrier signals of two different channels (i.e., $f_i \pm f_j$), while third-order interference corresponds to interference between the carrier signals of three different channels (i.e., $f_i \pm f_j \pm f_k$).

The three peak amplitude values A1, A2, and A3 are used to generate two different distortion values: a composite second-order distortion CSO and a composite triple-beat distortion CTB, where:

$$CSO = A1 - A2 \quad \text{(Equation 1)}$$

and $$CTB = A1 - A3, \quad \text{(Equation 2)}$$

where CSO and CTB may be represented in units of dBc relative to the carrier. These two distortion values are used by the test operator during the tuning of a pre-distortion board in order to optimize the linearity of an analog laser. In general, higher values for CSO and CTB correspond to a greater degree of linearity for the analog laser.

In a typical implementation, the tuning of a pre-distortion board involves adjusting the settings of potentiometers that control the magnitudes of resistors and capacitors in the pre-distortion circuit. A pre-distortion board typically has four potentiometers: one potentiometer for a resistor that affects the CSO distortion level, one potentiometer for a capacitor that affects the CSO distortion level, one potentiometer for a resistor that affects the CTB distortion level, and one potentiometer for a capacitor that affects the CTB distortion level.

Figure 3:
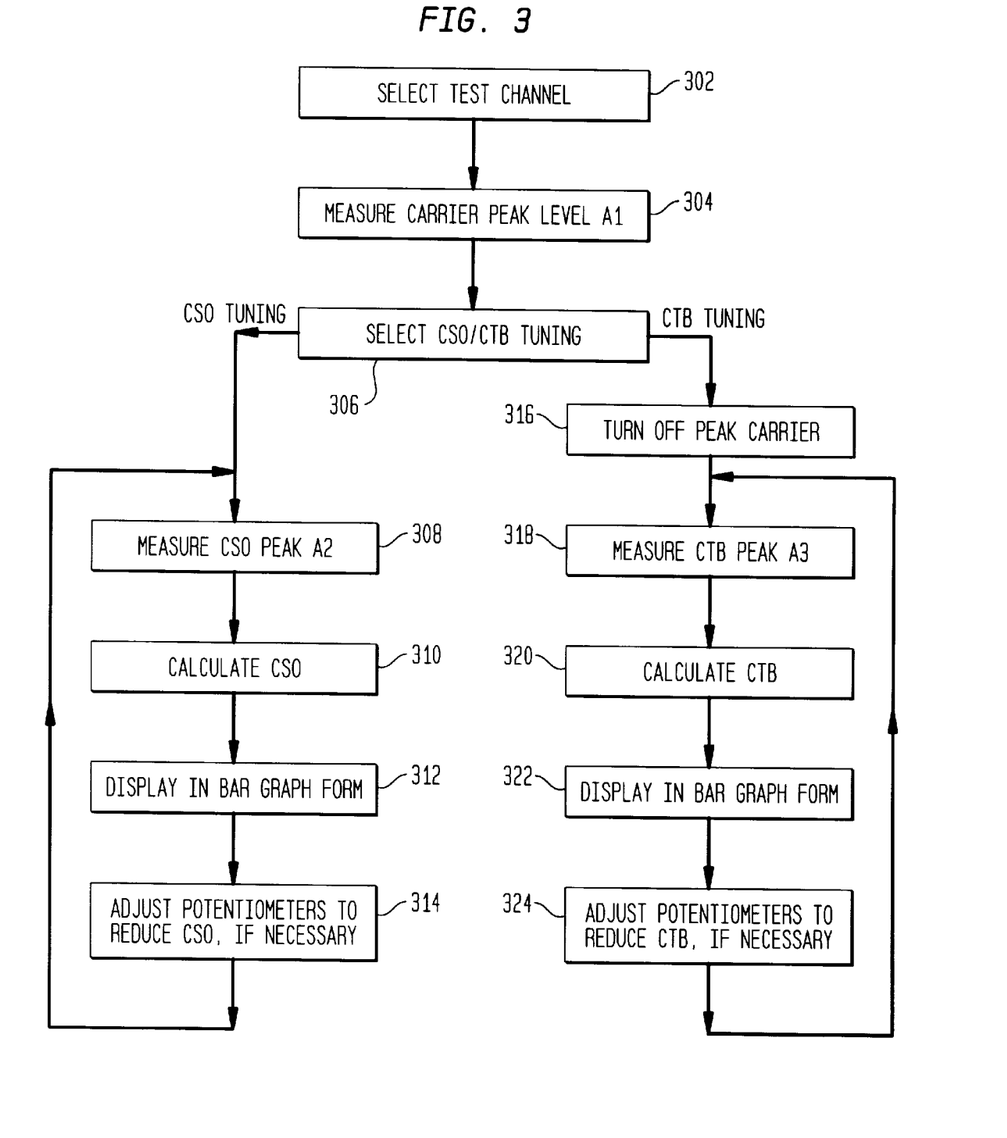
FIG. 3 shows a flow diagram of the processing implemented to tune a pre-distortion board to optimize the linearity of an analog laser using the test configuration of FIG. 1, according to one embodiment of the present invention.

FIG. 3 shows a flow diagram of the processing implemented to tune a pre-distortion board to optimize the linearity of an analog laser using test configuration 100 of FIG. 1, according to one embodiment of the present invention. Depending on the particular test sequence, some or all of the processing of FIG. 3 may be implemented for each of one or more different channel carrier frequencies.

In particular, when the test operator selects a particular channel (step 302 of FIG. 3), computer 122 instructs switch banks 112 and 116 to select the corresponding band-pass filter 114. With signal generator 102 generating a full composite signal (i.e., all N channels turned on), computer 122 processes data received from RF spectrum analyzer 118 to determine the carrier peak amplitude level A1 (step 304). When CSO testing is selected (step 306), computer 122 then determines the CSO peak amplitude level A2 (step 308), generates the CSO distortion level CSO using Equation (1) (step 310), and generates a corresponding CSO graphical display for presentation on monitor 124 (step 312). Depending on the information presented in the CSO graphical display, the test operator may adjust the settings for one or more of the CSO potentiometers on pre-distortion board 104 (step 314), in which case, steps 308–312 are repeated to update the CSO graphical display on monitor 124. In this way, the CSO graphical display provides the test operator with feed-back information to determine the acceptability of the current CSO potentiometer settings.

When CTB testing is selected (step 306), computer 122 causes signal generator 102 to generate a partial composite signal (i.e., all channels turned off except the test channel selected in step 302) (step 316). Computer 122 then determines the CTB peak amplitude level A3 (step 318), generates the CTB distortion level CTB using Equation (2) (step 320), and generates a corresponding CTB graphical display for presentation on monitor 124 (step 322). Depending on the information presented in the CTB graphical display, the test operator may adjust the settings for one or more of the CTB potentiometers on pre-distortion board 104 (step 324), in which case, steps 318–322 are repeated to update the CTB graphical display on monitor 124. In this way, the CTB graphical display provides the test operator with feed-back information to determine the acceptability of the current CTB potentiometer settings.

Figure 4:
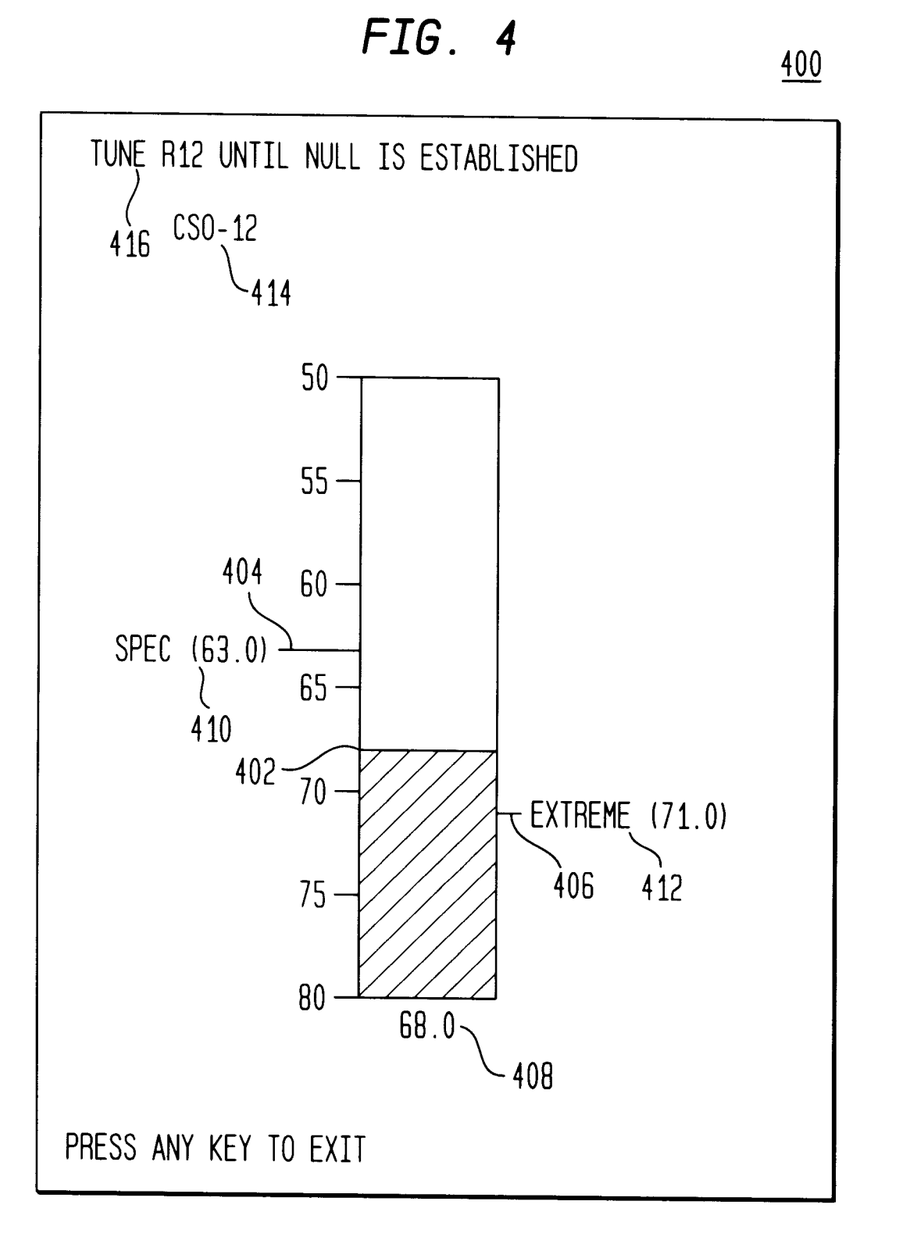
FIG. 4 shows an example of a graphical display generated by the computer of FIG. 1 for display on a monitor based on the processing of FIG. 3 during tuning of a pre-distortion board to optimize the linearity of an analog laser for either CSO or CTB distortion for a selected channel, according to one embodiment of the present invention.

FIG. 4 shows an example of a graphical display generated by computer 122 for display on monitor 124 based on the processing of FIG. 3 during tuning of a pre-distortion board to optimize the linearity of an analog laser for either CSO or CTB distortion for a selected channel, according to one embodiment of the present invention. The graphical display in FIG. 4 is a bar graph 400 that is updated in real time to indicate the current CSO or CTB distortion level 402 by the location in the vertical direction for the transition between dark and light portions of the bar graph, as determined by computer 122 using either Equation (1) or (2) in units of dBc. In addition to showing tic marks at every 5-dBc interval, the graphical display indicates (e.g., using horizontal tick marks) two additional distortion reference levels: a specified distortion requirement level 404 for the current test and an extreme distortion level 406 corresponding to the best distortion level achieved so far during the current test (where, in bar graph 400, the better the distortion level, the "lower" the transition between the dark and light portions of the bar graph). In addition to the graphical indications (i.e., the tick marks) for the current level, specified requirement level, and extreme level, bar graph 400 also includes text fields 408, 410, and 412, respectively, that identify the value of each level. Bar graph 400 also includes a text field 414 identifying the current test type (e.g., CSO testing for NTSC Channel 12) and a text field 416 identifying which potentiometer on the pre-distortion board is to be adjusted (e.g., the potentiometer for resistor R21). The position of the tick mark for the current distortion level 402 and the value in the corresponding text field 408 are continually updated and will typically change whenever a corresponding potentiometer setting is adjusted. Similarly, the position of the tick mark for the extreme distortion level 406 and the position and value of the corresponding text field 412 will change whenever the value of the current distortion level 402 exceeds the value of the previously saved extreme distortion level 406. On the other hand, the position of the tick mark for the specified distortion requirement level 404 and the position and value of the corresponding text field 410 are fixed for the processing of FIG. 3 corresponding to a particular test (i.e., either CSO or CTB testing for a selected channel).

During pre-distortion tuning, the test operator adjusts the settings of the appropriate potentiometers while watching a graphical display, similar to bar graph 400 of FIG. 4, to find potentiometer settings that ensure that the current distortion level 402 satisfies the specified distortion requirement level 404. The extreme distortion level 406 is a useful indication to the test operator of the best potentiometer setting achieved so far during the current test.

Figure 5:
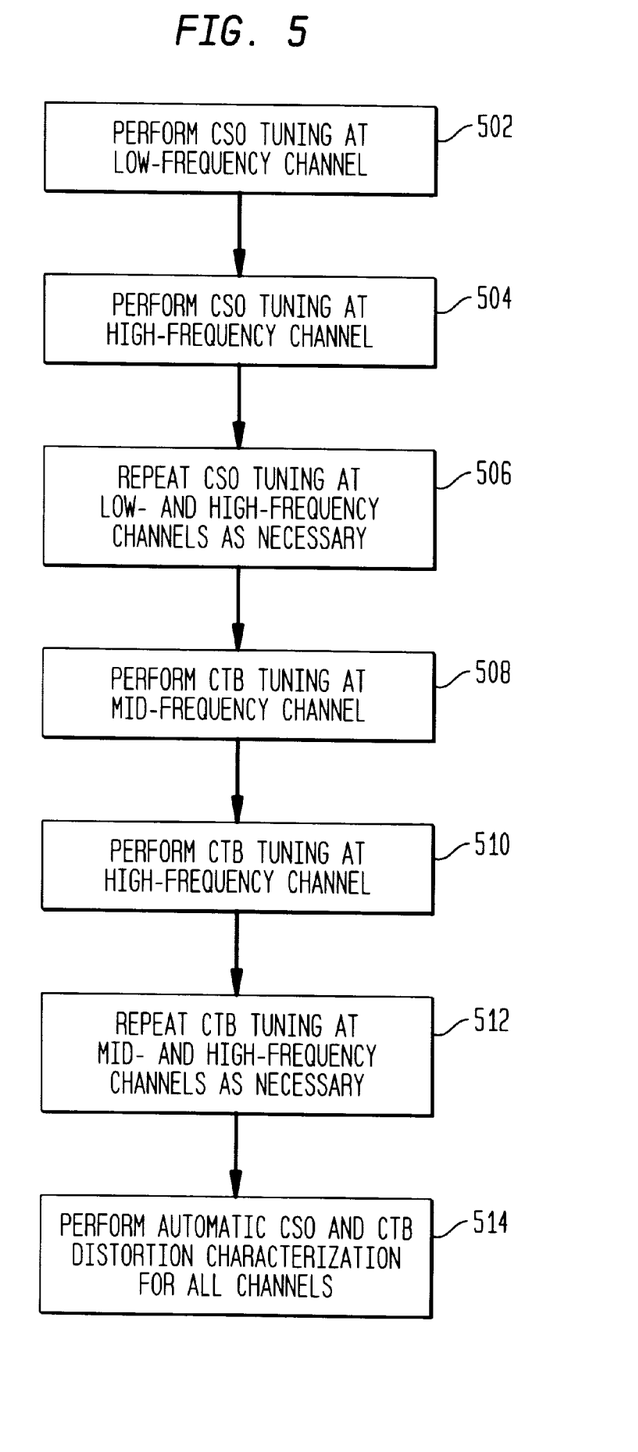
FIG. 5 shows a flow diagram of the overall test sequence implemented to tune a pre-distortion board to optimize the linearity of an analog laser using the test configuration of FIG. 1 and the processing of FIG. 3, according to one embodiment of the present invention.

FIG. 5 shows a flow diagram of the overall test sequence implemented to tune a pre-distortion board to optimize the linearity of an analog laser using test configuration 100 of FIG. 1 and the processing of FIG. 3, according to one embodiment of the present invention. Each step in FIG. 5 involves the implementation of at least some of the processing of FIG. 3. In particular, the processing of FIG. 5 involves the following steps:

Step 502: Select a low-frequency channel (e.g., NTSC Channel 3) and adjust as necessary the potentiometers for the CSO resistor and the CSO capacitor to tune the pre-distortion board to ensure that the analog laser satisfies the requirement for CSO distortion at the low-frequency channel;

Step 504: Select a high-frequency channel (e.g., NTSC Channel 78) and, if necessary, slightly adjust the CSO potentiometers to tune the pre-distortion board to ensure that the analog laser satisfies the requirement for CSO distortion at the high-frequency channel;

Step 506: If one or both of the CSO potentiometers were adjusted during Step 504, then repeat steps 502 and 504 as necessary until the analog laser satisfies the requirements for CSO distortion at both the low- and high-frequency channels;

Step 508: Select a mid-frequency channel (e.g., NTSC Channel 40) and adjust as necessary the potentiometers for the CAB resistor and the CTB capacitor to tune the pre-distortion board to ensure that the analog laser satisfies the requirement for CTB distortion at the mid-frequency channel;

Step 510: Select a high-frequency channel (e.g., NTSC Channel 78) and, if necessary, slightly adjust the CTB potentiometers to tune the pre-distortion board to ensure that the analog laser satisfies the requirement for CTB distortion at the high-frequency channel;

Step 512: If one or both of the CTB potentiometers were adjusted during Step 510, then repeat steps 508 and 510 as necessary until the analog laser satisfies the requirements for CTB distortion at both the mid- and high-frequency channels; and Step 514 Perform automatic CSO and CTB distortion measurements under computer control for all channels to verify that the current CSO and CTB potentiometer settings satisfy the requirements for both CSO distortion and CTB distortion for each and every channel.

The present invention provides advantages over the prior art. In particular, the graphical display of FIG. 4 provides the test operator with useful information that improves both the ease and efficiency with which test operators can achieve accurate tuning of pre-distortion boards to optimize the linearity of analog lasers for use in optical communication systems. The graphical display generated by the test computer provides the test operator with direct, real-time feedback of information (e.g., the height of a bar graph representing a current distortion level relative to a distortion requirement level), so that he or she can adjust potentiometer settings while viewing the computer monitor, and without having manually to record peak amplitude values and calculate CSO/CTB distortion levels.

Although the present invention has been described in the context of a bar graph that presents either the current CSO or CTB distortion level, it will be understood that the present invention can be implemented using suitable graphical displays other than bar graphs and/or presenting suitable information other than CSO and CTB distortion levels.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method used in manually tuning a pre-distortion board having a plurality of manually adjustable components and configured with an analog laser, comprising the steps of:

(a) applying electrical signals to the pre-distortion board, wherein the pre-distortion board converts the electrical signals into distorted electrical signals based on current settings of the manually adjustable components on the pre-distortion board and the analog laser converts the distorted electrical signals into optical signals;

(b) generating data characterizing the optical signals generated by the analog laser; and (c) generating a current distortion level based on the data generating a graphical display indicating the current distortion level, and presenting the graphical display on a computer monitor, wherein the graphical display provides information for use in manually adjusting settings of one or more of the manually adjustable components on the pre-distortion board, wherein the graphical display also indicates which one of the manually adjustable components on the pre-distortion board is to be adjusted to improve the current distortion level.

2. The invention of claim 1, wherein: the electrical signals are based on a selected test channel; and step (b) comprises the steps of:

(1) converting the optical signals into converted electrical signals;

(2) band-pass filtering the converted electrical signals based on the selected test channel to generate filtered electrical signals; and (3) characterizing amplitude of the filtered electrical signals as a function of frequency to generate the data.

3. The invention of claim 1, wherein the graphical display comprises a bar graph indicating the current distortion level.

4. The invention of claim 1, wherein the graphical display graphically indicates the current distortion level relative to a distortion requirement level.

5. The invention of claim 1, wherein the graphical display graphically indicates the current distortion level relative to an extreme distortion level corresponding to a best distortion level achieved so far for the manual tuning of the analog laser.

6. The invention of claim 1, wherein the graphical display further comprises a text field indicating a value for the current distortion level.

7. The invention of claim 1, wherein:

the graphical display comprises a bar graph indicating the current distortion level relative to a distortion requirement level and relative to an extreme distortion level corresponding to a best distortion level achieved so far for the manual tuning of the analog laser; and the graphical display further comprises text fields indicating values for the current distortion level; the distortion requirement level.

8. An apparatus used in manually tuning a pre-distortion board having a plurality of manually adjustable components and configured with an analog laser, comprising:

(a) means for applying electrical signals to the pre-distortion board, wherein the pre-distortion board converts the electrical signals into distorted electrical signals based on current settings of the manually adjustable components on the pre-distortion board and the analog laser converts the distorted electrical signals into optical signals;

(b) means for generating data characterizing the optical signals generated by the analog laser; and (c) means for generating a current distortion level based on the data, generating a graphical display indicating the current distortion level, and presenting the graphical display on a computer monitor, wherein the graphical display provides information for use in manually adjusting settings for one or more of the manually adjustable components on the pre-distortion board, wherein the graphical display also indicates which one of the manually adjustable components on the pre-distortion board is to be adjusted to improve the current distortion level.

9. An apparatus used in manually tuning a pre-distortion board having a plurality of manually adjustable components and configured with an analog laser, comprising:

(a) a signal generator adapted to generate electrical signals for application to the pre-distortion board, wherein the pre-distortion board converts the electrical signals into distorted electrical signals based on current settings of the manually adjustable components on the pre-distortion board and the analog laser converts the distorted electrical signals into optical signals;

(b) an optical receiver adapted to convert the optical signals into converted electrical signals;

(c) a spectrum analyzer adapted to generate data characterizing the converted electrical signals; and (d) a computer adapted to generate a current distortion level based on the data, generating a graphical display indicating the current distortion level, and present the graphical display on a computer monitor, wherein the graphical display provides information for use in manually adjusting settings for one or more of the manually adjustable components on the pre-distortion board, wherein the graphical display also indicates which one of the manually adjustable components on the pre-distortion board is to be adjusted to improve the current distortion level.

10. The invention of claim 9, wherein:

the apparatus further comprises a band-pass filter adapted to filter the converted electrical signals to generate filtered electrical signals, wherein the spectrum analyzer is adapted to characterize the filtered electrical signals;

the computer is adapted to control the signal generator to generate composite electrical signals having two or more different carrier-frequency signals; and the computer is adapted to control one or more switch banks to select the band-pass filter from a plurality of band-pass filters.

11. The invention of claim 10, wherein the computer is adapted to control the signal generator and the one or more switch banks to automatically characterize the performance of the analog laser for two or more different carrier-frequency signals.

12. The invention of claim 9, wherein:

the graphical display comprises a bar graph indicating the current distortion level relative to a distortion requirement level and relative to an extreme distortion level corresponding to a best distortion level achieved so far for the manual tuning of the analog laser; and the graphical display further comprises text fields indicating values for the current distortion level; the distortion requirement level, and the extreme distortion level.

13. A method used in manually tuning a pre-distortion board having a plurality of manually adjustable components and configured with an analog laser, comprising the steps of:

(a) receiving data characterizing optical signals generated by the analog laser based on distorted electrical signals generated by the pre-distortion board based on current settings of the manually adjustable components on the pre-distortion board; and (b) generating a current distortion level based on the data, generating a graphical display indicating the current distortion level, and presenting the graphical display on a computer monitor, wherein the graphical display provides information for use in manually adjusting the settings of one or more of the manually adjustable components on the pre-distortion board, wherein the graphical display also indicates which one of the manually adjustable components on the pre-distortion board is to be adjusted to improve the current distortion level.

14. The invention of claim 13, wherein the graphical display comprises a bar graph indicating the current distortion level.

15. The invention of claim 13, wherein the graphical display graphically indicates the current distortion level relative to a distortion requirement level.

16. The invention of claim 13, wherein the graphical display graphically indicates the current distortion level relative to an extreme distortion level corresponding to a best distortion level achieved so far for the manual tuning of the analog laser.

17. The invention of claim 13, wherein the graphical display further comprises a text field indicating a value for the current distortion level.

18. The invention of claim 13, wherein:
the graphical display comprises a bar graph indicating the current distortion level relative to a distortion requirement level and relative to an extreme distortion level corresponding to a best distortion level achieved so far for the manual tuning of the analog laser; and
the graphical display further comprises text fields indicating values for each of the current distortion level; the distortion requirement level, and the extreme distortion level.

19. A storage medium encoded with machine-readable program code used in manually tuning a pre-distortion board having a plurality of manually adjustable components and configured with an analog laser, wherein, when the program code is executed by a machine, the machine implements the steps of:
(a) receiving data characterizing optical signals generated by the analog laser based on distorted electrical signals generated by the pre-distortion board based on current settings of the manually adjustable components on the pre-distortion board; and
(b) generating a current distortion level based on the data generating a graphical display indicating the current distortion level, and presenting the graphical display on a computer monitor, wherein the graphical display provides information for use in manually adjusting the settings of one or more of the manually adjustable components on the pre-distortion board, wherein the graphical display also indicates which one of the manually adjustable components on the pre-distortion board is to be adjusted to improve the current distortion level.

20. The invention of claim 19, wherein:
the graphical display comprises a bar graph indicating the current distortion level relative to a distortion requirement level and relative to an extreme distortion level corresponding to a best distortion level achieved so far for the manual tuning of the analog laser; and
the graphical display further comprises text fields indicating values for the current distortion level; the distortion requirement level, and the extreme distortion level.

21. A computer used in manually tuning a pre-distortion board having a plurality of manually adjustable components and configured with an analog laser, wherein:
(a) the computer is adapted to receive data characterizing optical signals generated by the analog laser based on distorted electrical signals generated by the pre-distortion board based on current settings of the manually adjustable components on the pre-distortion board; and
(b) the computer is adapted to generate a current distortion level based on the data, generate a graphical display indicating the current distortion level, and present the graphical display on a computer monitor, wherein the graphical display provides information for use in manually adjusting the settings of one or more of the manually adjustable components on the pre-distortion board, wherein the graphical display also indicates which one of the manually adjustable components on the pre-distortion board is to be adjusted to improve the current distortion level.

22. The invention of claim 21, wherein:
the graphical display comprises a bar graph indicating the current distortion level relative to a distortion requirement level and relative to an extreme distortion level corresponding to a best distortion level achieved so far for the manual tuning of the analog laser; and
the graphical display further comprises text fields indicating values for the current distortion level; the distortion requirement level, and the extreme distortion level.

* * * * *

UNITED STATES PATENT AND TRADEMARK OFFICE
CERTIFICATE OF CORRECTION

PATENT NO. : 6,246,965 B1
DATED : June 12, 2001
INVENTOR(S) : Kenneth L. Cockerham, Stephen B. Krasulick, Thomas F. Strelchun, Paul K. Tallat-Kelpsa, and Anthony J. Wiencek It is certified that error appears in the above-identified patent and that said Letters Patent is hereby corrected as shown below:

<u>Title page,</u>
Item [56], References Cited, replace "5,600,475" with -- 5,600,472 --.

Signed and Sealed this

Thirtieth Day of October, 2001

Attest:

NICHOLAS P. GODICI
Attesting Officer
Acting Director of the United States Patent and Trademark Office